US012715202B2

(12) United States Patent
Short et al.

(10) Patent No.: US 12,715,202 B2
(45) **Date of Patent: *Aug. 25, 2026**

(54) PAINTABLE AND BONDABLE LAMINATE

(71) Applicant: SIMONA PMC LLC, Findlay, OH (US)

(72) Inventors: Eric David Short, Van Buren, OH (US); Samantha Ann Stacy, Findlay, OH (US)

(73) Assignee: SIMONA AMERICA Group Inc., Findlay, OH (US)

( * ) Notice: Subject to any disclaimer, the term of this patent is extended or adjusted under 35 U.S.C. 154(b) by 200 days.

This patent is subject to a terminal disclaimer.

(21) Appl. No.: 18/777,113

(22) Filed: Jul. 18, 2024

(65) Prior Publication Data

US 2024/0367424 A1 Nov. 7, 2024

Related U.S. Application Data

(62) Division of application No. 17/807,004, filed on Jun. 15, 2022, now Pat. No. 12,187,013.

(60) Provisional application No. 63/226,228, filed on Jul. 28, 2021.

(51) Int. Cl.

| | |
|---|---|
| ***B32B 27/08*** | (2006.01) |
| ***B32B 7/12*** | (2006.01) |
| ***B32B 27/32*** | (2006.01) |
| ***B32B 27/40*** | (2006.01) |
| ***B32B 37/24*** | (2006.01) |

(52) U.S. Cl.

CPC ................ *B32B 27/08* (2013.01); *B32B 7/12* (2013.01); *B32B 27/32* (2013.01); *B32B 27/40* (2013.01); *B32B 37/24* (2013.01); *B32B 2037/243* (2013.01); *B32B 2307/4023* (2013.01); *B32B 2307/738* (2013.01)

(58) Field of Classification Search

CPC ........... B32B 3/08; B32B 27/08; B32B 27/32; B32B 27/40; B32B 37/24; B32B 37/10; B32B 7/12

USPC .......................................................... 156/324

See application file for complete search history.

(56) References Cited

U.S. PATENT DOCUMENTS

| | | | | |
|---|---|---|---|---|
| 3,709,399 | A | 1/1973 | Nughes | |
| 12,187,013 | B2 * | 1/2025 | Short | B32B 7/12 |
| 2009/0297820 | A1 | 12/2009 | Kovalchuk | |
| 2014/0377575 | A1 | 12/2014 | Langstaff | |
| 2017/0229047 | A1 | 8/2017 | Inubushi | |

* cited by examiner

*Primary Examiner* — James D Sells

(57) ABSTRACT

A laminate product is disclosed. The laminate product includes a base layer formed from a thermoplastic polyolefin and a bondable first layer laminated to the base layer. Paint, ink, or attachments may be applied to the bondable first layer. A method of producing the laminate product includes the steps of laminating a base layer and a bondable first layer by application of pressure and heat to the base layer and the first layer. Paint, ink, or attachments may then be applied to the bondable first layer.

17 Claims, 4 Drawing Sheets

PAINTABLE AND BONDABLE LAMINATE

CROSS-REFERENCE TO RELATED APPLICATIONS

This patent application is a divisional application of U.S. Ser. No. 17/807,004, filed Jun. 15, 2022, which claims priority to U.S. Provisional Application No. 63/226,228, filed Jul. 28, 2021, which is hereby incorporated by reference in its entirety.

FIELD OF THE INVENTION

The present technology relates to a paintable and bondable multi-layered thermoplastic article.

BACKGROUND

Thermoplastic polyolefin (TPO) is a multiphase composition in which one phase includes a material that is hard and stiff at room temperature and fluid when heated and another phase that includes an elastomeric material that is soft and rubberlike at room temperature. Various blends of materials can be included in the TPO, where typically there are portions of a thermoplastic polymer, an elastomer, and a filler to provide rigidity. TPOs can be designed to be tough and durable and can be tailored to meet specific application requirements. Other notable aspects of TPOs include chemical resistance and the ability to be recycled. TPO is used in various applications, including automotive, building and construction, and other industrial applications.

Respective portions of thermoplastic polyolefin, elastomer, and filler can be tailored to provide certain properties depending on the application. Examples of thermoplastic polyolefin include polypropylene (PP), polyethylene (PE), and/or block copolymer polypropylene (BCPP), among others. Examples of elastomers include ethylene propylene rubber (EPR), EPDM (EP-diene rubber), ethylene-octene (EO), ethylbenzene (EB), and/or styrene ethylene butadiene styrene (SEBS), among others. Examples of fillers include talc, calcium carbonate, fiberglass, carbon fiber, wollastonite, and/or MOS (Metal Oxy Sulfate), among others. Depending upon the type of filler used, characteristics of the resulting TPO can be modified to enhance strength, scratch resistance, impact resistance, and weight, among other characteristics. TPO can be processed by injection molding, profile and sheet extrusion, and thermoforming.

Typically, since TPO is a low-surface energy material, it is difficult to paint and/or bond attachments thereto. If TPO is required to be painted or have attachments bonded thereto, this requires special techniques and/or materials such as a corona or plasma treatments to increase the surface energy of the TPO surface. These methods are expensive and time consuming.

Accordingly, it is desirable to provide a TPO based material which is easy to paint and/or bond and wherein cost and complexity are minimized.

SUMMARY OF THE INVENTION

Consistent and consonant with the present disclosure, a TPO based material which is easy to paint and/or bond and wherein a cost and complexity are minimized has surprisingly been discovered.

In one aspect, the present invention is a laminate product comprising a base layer produced from a thermoplastic polyolefin, and a first layer laminated to the base layer. In one embodiment, the first layer is a multi-layer film. According to one embodiment, the multi-layer film comprises a polypropylene layer, a tie layer and a polyurethane layer. In one embodiment, the tie layer is a polyolefin homopolymer or a polyolefin copolymer. In some embodiments, the laminate product further includes a paint layer adjacent to the first layer. Additionally, or alternatively, the laminate product includes an ink layer adjacent to the first layer. In some embodiments, the laminate product includes an attachment adhered, or bonded to, the first layer. The attachment may be plastic, metal, foam, gel, fiberglass, or fiber-reinforced plastic.

In another aspect, the present invention is a laminate product comprising a base layer produced from a thermoplastic polyolefin, a first layer laminated to a first side of the base layer, and a second layer laminated to a second side of the base layer. In one embodiment, the first layer and second layer are a multi-layer film. According to one embodiment, the multi-layer film comprises a polypropylene layer, a tie layer and a polyurethane layer. In one embodiment, the tic layer is a polyolefin homopolymer or a polyolefin copolymer. In some embodiments, the laminate product may further include a paint layer adjacent to the first layer and/or second layer. Additionally, or alternatively, the laminate product includes an ink layer adjacent to the first layer and/or second layer. In some embodiments, the laminate product includes an attachment adhered, or bonded to, the first layer and/or second layer. The attachment may be plastic, metal, foam, gel, fiberglass, or fiber-reinforced plastic.

In yet another aspect, the present invention also includes a method of producing a laminate product. The method comprises the steps of laminating a first layer to a first side of a base layer, to form a laminate sheet, by application of pressure and heat to the base layer and first layer. The pressure applied during lamination may be of about 200 psi to about 300 psi. The heat applied during lamination may be of about 250 degrees Fahrenheit to about 325 degrees Fahrenheit. The method may further comprise laminating a second layer to a second side of the base layer. In some embodiments, the method further includes thermoforming the laminate sheet into a desired configuration. In another embodiment, the method may further include applying a paint to the first layer and/or second layer. Additionally, or alternatively, the method may further include applying an ink to the first layer and/or second layer. In another embodiment, the method may further include bonding an attachment to the first layer and/or second layer using a common adhesive or tape. In some embodiments, the attachment may be plastic, metal, foam, gel, fiberglass, or fiber-reinforced plastic.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes for selected embodiments and not all possible implementations, and are not intended to limit the scope of the present disclosure.

DETAILED DESCRIPTION

Figure 1:
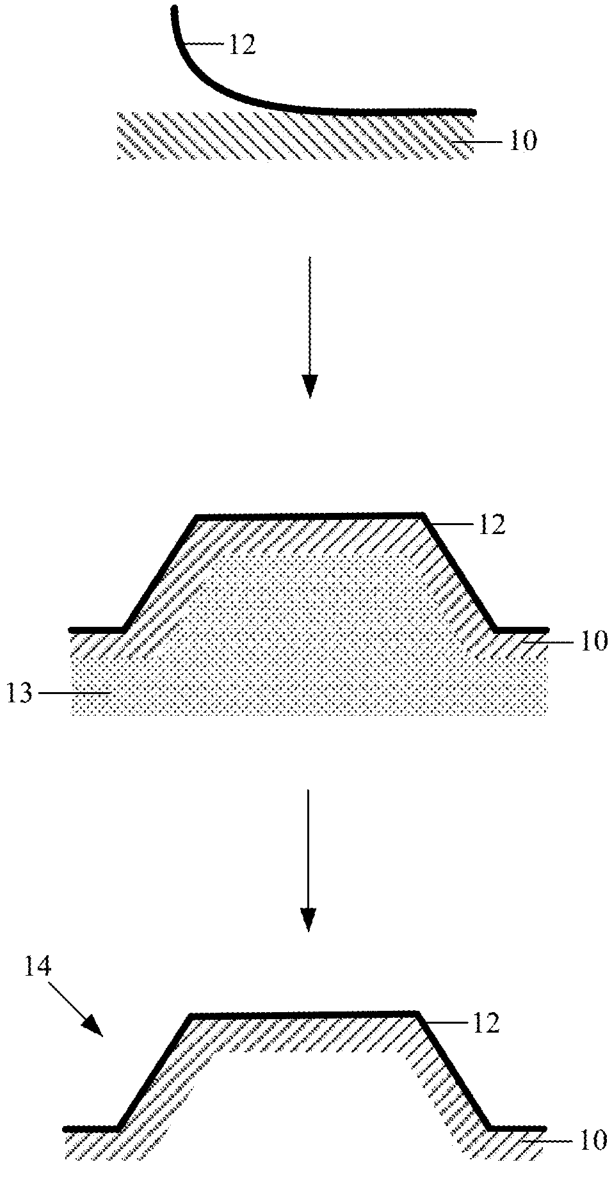
FIG. 1 is a schematic representation of a laminate product and a process for producing the laminate product according to an embodiment of the invention.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

The present technology provides a paintable and bondable TPO laminate material. The TPO laminate material described herein is bonded to a multilayer film, via lamination. The multilayer film provides the laminate with a higher surface energy than non-functionalized TPO. The TPO laminate material described herein may be painted, or printed on, without the use of adhesion promotors and without the need for sanding. Typical non low-surface energy adhesives may be used with the TPO laminate material for the adhesion of attachments. Additionally, foam may be directly adhered to the TPO laminate material for increased strength.

FIG. 1 illustrates a laminate product and a process for producing the laminate product. The laminate product includes a base layer 10 and a first layer 12. In the embodiment shown, the base layer 10 is a thermoplastic polyolefin (TPO), although other materials such as other plastics, metals, and fiberglass having desired properties can be used as desired. The TPO base layer 10 is typically a plastic chosen by an end user based on physical properties and characteristics thereof. In certain embodiments, the TPO is a polypropylene based TPO. The base layer 10 can be formed by any conventional process such as extrusion and the like, for example. In some embodiments, the base layer 10 is between 0.030 inches and 0.450 inches, although the base layer 10 can be any thickness, as desired. Further, the base layer 10 may be formed into relatively thinner, flexible sheets or relatively thicker, rigid sheets as desired.

The first layer 12 is a film which may be laminated to the base layer 10. As shown, the first layer 12 is a multi-layer film produced from polypropylene, a tie layer, and a polyurethane layer. The tie layer may be produced from one or more polymers or copolymers. For example, the tic layer may include a polyolefin homopolymer or polyolefin copolymer. In further examples, the homopolymer or copolymer may further include one or more of polyethylene, polypropylene, polybutylene, and combinations and copolymers thereof. However, it is understood layers including other materials can be used as desired. The first layer 12 can be a film sold under the registered trademark Claza®, for example. In some embodiments, a thickness of the film may be between about 0.0005 inches to about 0.025 inches, although other thicknesses can be used as desired. The first layer provides the laminate with a bondable surface. Bondable, for the purposes of this disclosure means that the surface may be painted, printed, or adhered to without the need for extensive pre-treatment or sanding. In the embodiment shown, the film acts as a polar surface, which does not require surface pretreatment to promote adhesion. For example, when adhering plastics or metal, a standard liquid adhesive or pressure sensitive adhesive (PSA) tape is used. For fiberglass reinforced plastic (FRP), a resin and chopped fiberglass are used. For paints or foams, no adhesion promoter is used and the paint or foam is sprayed directly. For inks, no adhesion promotor is used and the ink is printed directly on the first layer 12.

To produce the laminate product, the base layer 10 and the first layer 12 may be laminated using application of pressure and heat to the layers 10, 12. Favorable results have been obtained when using a temperature of about 250 degrees Fahrenheit to about 350 degrees Fahrenheit and a pressure of about 200 psi to about 300 psi, although other pressures and temperatures can be used as desired. Once laminated, the laminate product may be used in sheet form or further processed. The further processing may include thermoforming the laminate product into a desired shape and/or configuration, as illustrated in FIG. 1 using a mold 13 to produce the thermoformed product 14. Once in the desired form of a sheet or thermoformed product, the first layer 12 of the laminate product may be painted without surface preparation, bonded to attachments or other materials by use of a common adhesive, tape, or other adhesion method, printed with ink, and the like. Examples include further adhesion to another TPO material, adhesion to a plastic, adhesion to a metal, adhesion to a foam, adhesion to a gel, adhesion to fiberglass for reinforcing or insulating, and the like.

Use of the first layer 12 allows painting of the TPO and use of common adhesives instead of special, more expensive adhesives and special adhesives requiring more time to bond to attachments or other materials. Thus, the resultant final product is less expensive and more efficient to make than using known painting or bonding methods directly on a surface of the TPO.

Figure 2:
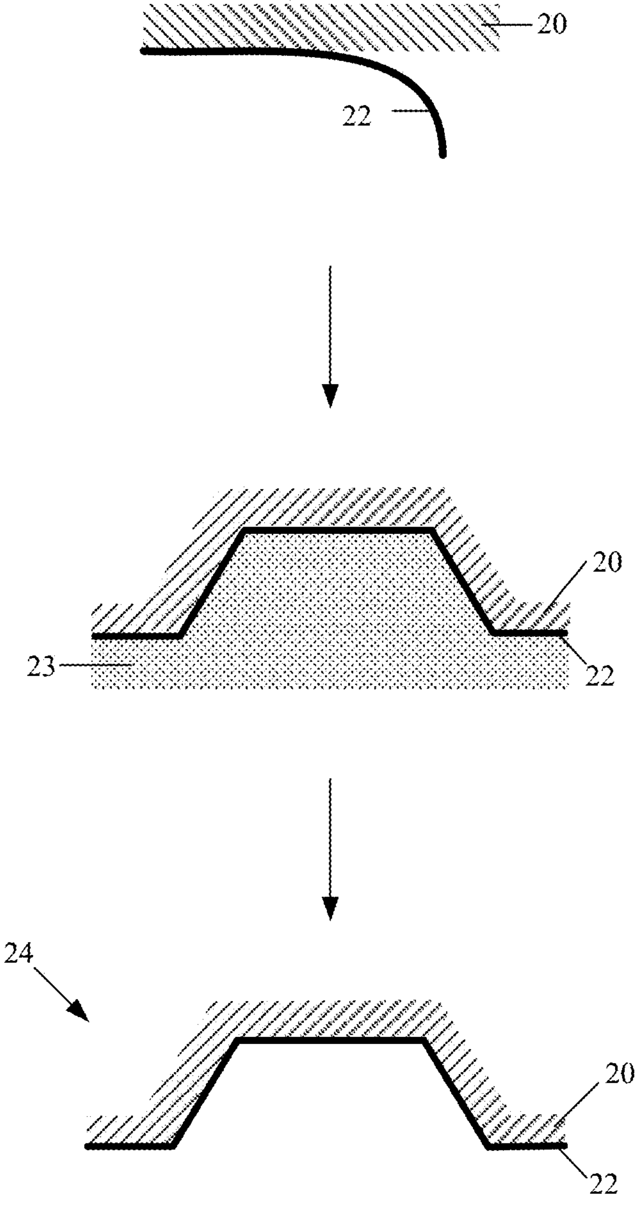
FIG. 2 is a schematic representation of a laminate product and a process for producing the laminate product according to another embodiment of the invention.

FIG. 2 illustrates a laminate product and a process for producing the laminate product according to another embodiment of the disclosure. The laminate product includes a base layer 20 and a second layer 22. In the embodiment shown, the base layer 20 is a thermoplastic polyolefin (TPO), although other materials having desired properties can be used as desired. In certain embodiments, the TPO is a polypropylene based TPO. The base layer 20 can be formed by any conventional process such as extrusion and the like, for example. In some embodiments, the base layer 20 is between 0.030 inches and 0.450 inches, although the base layer 20 can be any thickness, as desired. Further, the base layer 20 may be formed into thin, flexible sheets or thick, rigid sheets as desired.

The second layer 22 is a film which may be laminated to the base layer 20. As shown, the second layer 22 is a multi-layer film produced from polypropylene, a tie layer, and a polyurethane layer. The tie layer may be produced from one or more polymers or copolymers. For example, the tie layer may include a polyolefin homopolymer or polyolefin copolymer. In further examples, the homopolymer or copolymer may further include one or more of polyethylene, polypropylene, polybutylene, and combinations and copolymers thereof. However, it is understood layers including other materials can be used as desired. The second layer 22 can be a film sold under the registered trademark Claza®, for example. In some embodiments, a thickness of the film may be between about 0.0005 inches to about 0.025 inches, although other thicknesses can be used.

To produce the laminate product 24, the base layer 20 and the second layer 22 may be laminated using application of pressure and heat to the layers 20, 22. Favorable results have been obtained when using a temperature of about 250 degrees Fahrenheit to about 325 degrees Fahrenheit and a pressure of about 200 psi to about 300 psi, although other pressures and temperatures can be used as desired. Once laminated, the laminate product 24 may be used in sheet form or further processed. The further processing may include thermoforming the laminate product 24 into a desired shape and/or configuration using a mold 23. Once in the desired form of a sheet or thermoformed product, the second layer 22 of the laminate product may be painted without surface preparation, bonded to attachments or other materials by use of a common adhesive, tape, or other adhesion method, printed with ink, and the like. Examples include further adhesion to another TPO material, adhesion to plastics, adhesion to metal, adhesion to foam, adhesion to a gel, adhesion to fiberglass for reinforcing or insulating, and the like.

Use of the second layer 22 allows painting of the TPO and use of common adhesives instead of special, more expensive adhesives and special adhesives requiring more time to bond to attachments or other materials. Thus, the resultant final product is less expensive and more efficient to make than using known painting or bonding methods directly on a surface of the TPO.

Figure 3:
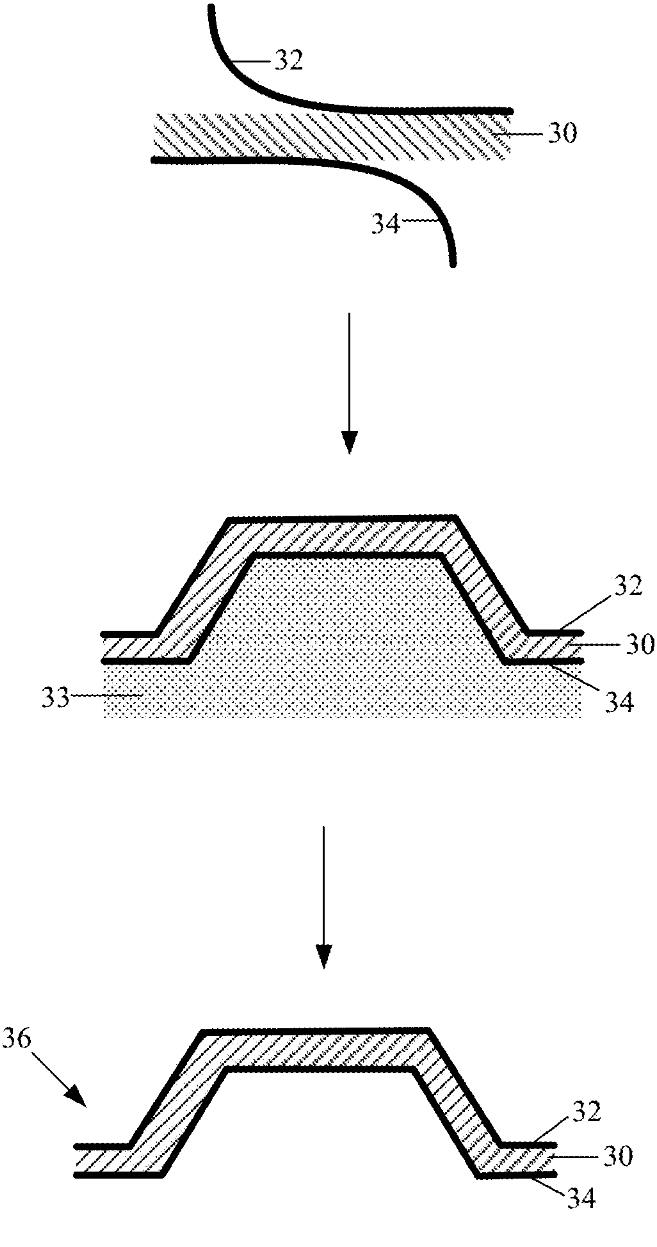
FIG. 3 is a schematic representation of a laminate product and a process for producing the laminate product according to another embodiment of the invention.

FIG. 3 illustrates a laminate product and a process for producing the laminate product according to another embodiment of the disclosure. The laminate product includes a base layer 30, a first layer 32, and a second layer 34. In the embodiment shown, the base layer 30 is a thermoplastic polyolefin (TPO), although other materials having desired properties can be used as desired. In certain embodiments, the TPO is a polypropylene based TPO. The base layer 30 can be formed by any conventional process such as extrusion and the like, for example. As shown, the base layer 30 is typically between 0.030 inches and 0.450 inches, although the base layer 30 can be any thickness, as desired. Further, the base layer 30 may be formed into thin, flexible sheets or thick, rigid sheets as desired.

The first layer 32 is a film which may be laminated to the base layer 30. As shown, the first layer 32 is a multi-layer film produced from polypropylene, a tie layer, and a polyurethane layer. The tie layer may be produced from one or more polymers or copolymers. For example, the tic layer may include a polyolefin homopolymer or polyolefin copolymer. In further examples, the homopolymer or copolymer may further include one or more of polyethylene, polypropylene, polybutylene, and combinations and copolymers thereof. However, it is understood layers including other materials can be used as desired. The first layer 32 can be a film sold under the registered trademark Claza®, for example. As shown, a thickness of the film may be between about 0.0005 inches to about 0.025 inches, although other thicknesses can be used.

The second layer 34 is a film which may be laminated to the base layer 30. As shown, the second layer 34 is a multi-layer film produced from polypropylene, a tic layer, and a polyurethane layer. The tic layer may be produced from one or more polymers or copolymers. For example, the tie layer may include a polyolefin homopolymer or polyolefin copolymer. In further examples, the homopolymer or copolymer may further include one or more of polyethylene, polypropylene, polybutylene, and combinations and copolymers thereof. However, it is understood layers including other materials can be used as desired. The second layer 34 can be a film sold under the registered trademark Claza®, for example. As shown, a thickness of the film may be between about 0.0005 inches to about 0.025 inches, although other thicknesses can be used. As shown, the first layer 32 and the second layer 34 are formed from the same material. However, the first layer 32 and the second layer 34 may be formed from different materials, if desired.

To produce the laminate product 36, the base layer 30, the first layer 32, and the second layer 34 may be laminated using application of pressure and heat to the layers 30, 32, 34. Favorable results have been obtained when using a temperature of about 250 degrees Fahrenheit to about 325 degrees Fahrenheit and a pressure of about 200 psi to about 300 psi, although other pressures and temperatures can be used as desired. Once laminated, the laminate product may be used in sheet form or further processed. The further processing may include thermoforming the laminate product 36 into a desired shape and/or configuration using a mold 33. Once in the desired form of a sheet or thermoformed product, the first layer 32 and the second layer 34 of the laminate product may be painted without surface preparation, bonded to attachments or other materials by use of a common adhesive, tape, or other adhesion method, and the like. Examples of may be further adhesion to another TPO material, adhesion to plastics, adhesion to metal, adhesion to foam, adhesion to a gel, adhesion to fiberglass for reinforcing or insulating, and the like.

Use of the first layer 32 and the second layer 34 allows painting of the TPO and use of common adhesives instead of special, more expensive adhesives and special adhesives requiring more time to bond to attachments or other materials. Thus, the resultant final product is less expensive and more efficient to make than using known painting or bonding methods directly on a surface of the TPO.

Figure 4:
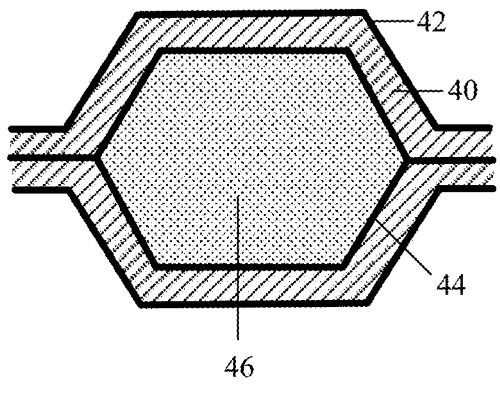
FIG. 4 is a schematic representation of a processed laminate product according to another embodiment of the invention.

FIG. 4 represents a laminate product as described herein, comprising a TPO base layer 40, a first layer 42 and a second layer 44, adhered to a second laminate product, and an additional attachment 46 adhered to second layer 44 of each laminate product. As shown, the additional attachment is structural foam, but it should be understood that other materials may be used for reinforcement as desired. Other examples of attachments include: plastic, metal, gel, fiberglass, and the like.

Figure 5:
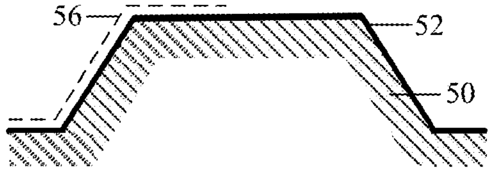
FIG. 5 is a schematic representation of a processed laminate product according to another embodiment of the invention.

FIG. 5 represents a laminate product as described herein, comprising a TPO base layer 50 and a first layer 52. The laminate product represented in FIG. 5 further comprises an additional layer 56. In some example embodiments, layer 56 may be a paint layer. The paint layer may be applied on the first layer 52 without surface preparation. In other example embodiments, layer 56 may be an ink layer. The ink layer may be printed on the first layer 56 without surface preparation.

Figure 6:
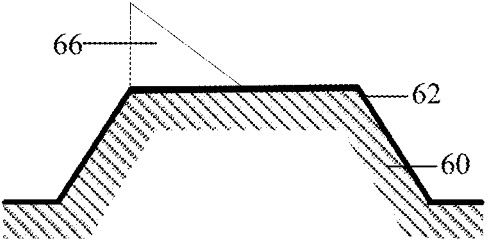
FIG. 6 is a schematic representation of a processed laminate product according to another embodiment of the invention.

FIG. 6 represents a laminate product as described herein, comprising a TPO base layer 60 and a first layer 62. The laminate product represented in FIG. 6 further comprises an attachment 66. Attachment 66 may be applied using common adhesive, tape, or other adhesion method. Examples may include further adhesion to another TPO material, adhesion to plastics, adhesion to metal, adhesion to foam, adhesion to a gel, adhesion to fiberglass for reinforcing or insulating, and the like.

Example embodiments are provided so that this disclosure is thorough, and fully conveys the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method for producing a formable laminate product, the method comprising:

laminating a first layer to a first side of a base layer to form a laminate sheet, wherein laminating the first layer further comprises applying pressure and heat to the base layer and the first layer;

wherein the first layer is continuously positioned on an entire surface of the base layer, wherein the base layer is a thermoplastic polyolefin;

wherein the base layer has a thickness from 0.030 inches to 0.450 inches;

wherein the first layer is bondable;

wherein the first layer consists of a multi-layer film; and wherein the multi-layer film consists of a polypropylene layer, a tie layer, and a polyurethane layer.

2. The method of claim 1, wherein the applying pressure comprises applying a pressure of about 200 psi to about 300 psi.

3. The method of claim 1, wherein the applying heat comprises applying a temperature of about 250 degrees Fahrenheit to about 325 degrees Fahrenheit.

4. The method of claim 1, wherein the method further comprises thermoforming the laminate sheet into a desired configuration.

5. The method of claim 1, wherein the method further comprises applying a paint to the first layer.

6. The method of claim 1, wherein the method further comprises applying an ink to the first layer.

7. The method of claim 1, wherein the method further comprises bonding an attachment to the first layer;

wherein bonding attachments comprises use of an adhesive or a tape, and wherein the attachment is comprised of a plastic, a metal, a foam, a gel, fiberglass, or a fiber-reinforced plastic.

8. A method for producing a formable laminate product, the method comprising:

laminating a first layer to a first side of a base layer and a second layer to a second side of the base layer to form a laminate sheet, wherein the first layer is continuously positioned on an entire first surface of the base layer and the second layer is continuously positioned on an entire second surface of the base layer;

wherein the base layer is a thermoplastic polyolefin;

wherein the base layer has a thickness from 0.030 inches to 0.450 inches;

wherein the first layer is bondable;

wherein the first layer consists of a first multi-layer film;

wherein the first multi-layer film consists of a first polypropylene layer, a first tie layer, and a first polyurethane layer;

wherein the second layer is bondable;

wherein the second layer consists of a second multi-layer film; and wherein the second multi-layer film consists of a second polypropylene layer, a second tie layer, and a second polyurethane layer.

9. The method of claim 8, wherein the laminating step further comprises applying a pressure of about 200 psi to about 300 psi.

10. The method of claim 8, wherein the laminating step further comprises applying a temperature of about 250 degrees Fahrenheit to about 325 degrees Fahrenheit.

11. The method of claim 8, wherein the method further comprises thermoforming the laminate sheet into a desired configuration.

12. The method of claim 8, wherein the method further comprises applying a paint to the first layer.

13. The method of claim 8, wherein the method further comprises applying an ink to the first layer.

14. The method of claim 8, wherein the method further comprises bonding an attachment to the first layer;

wherein bonding attachments comprises use of an adhesive or a tape, and wherein the attachment is comprised of a plastic, a metal, a foam, a gel, fiberglass, or a fiber-reinforced plastic.

15. The method of claim 8, wherein the method further comprises applying a paint to the second layer.

16. The method of claim 8, wherein the method further comprises applying an ink to the second layer.

17. The method of claim 8, wherein the method further comprises bonding an attachment to the second layer;

wherein bonding attachments comprises use of an adhesive or a tape, and wherein the attachment is comprised of a plastic, a metal, a foam, a gel, fiberglass, or a fiber-reinforced plastic.

* * * * *